Figure 1:
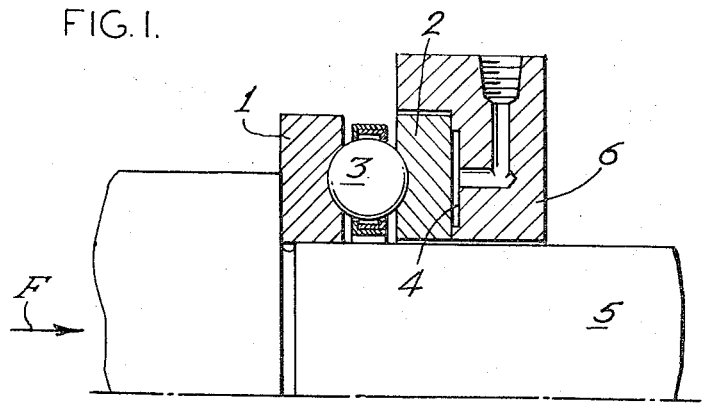

United States Patent [19]
Bildtsén

[11] 3,854,781
[45] Dec. 17, 1974

[54] COMBINED HYDROSTATIC BEARING AND ROLLING BEARING

[75] Inventor: Sven Christian Bildtsén, Lerum, Sweden

[73] Assignee: SKF Industrial Trading and Development Company B. V., Jutphaas, Netherlands

[22] Filed: Mar. 16, 1973

[21] Appl. No.: 342,278

[30] Foreign Application Priority Data
Apr. 27, 1972 Sweden.................................. 5548/72

[52] U.S. Cl...................................... 308/35, 308/9
[51] Int. Cl................................................ F16c 32/00
[58] Field of Search....................... 308/35, 9, 5, 122

[56] References Cited
UNITED STATES PATENTS

| | | | |
|---|---|---|---|
| 1,441,614 | 1/1923 | Wadsworth........................ | 308/160 |
| 2,623,353 | 12/1952 | Gerard............................... | 308/35 |
| 2,969,680 | 1/1961 | Linn et al. ........................ | 308/35 |
| 3,012,827 | 12/1961 | Goetz................................. | 308/35 |
| 3,143,381 | 8/1964 | Vurpillot........................... | 308/9 |
| 3,158,413 | 11/1964 | Shelley.............................. | 308/35 |
| 3,499,692 | 3/1970 | Kaiser............................... | 308/35 |
| 3,708,215 | 1/1973 | Wilcock............................ | 308/35 |
| 3,759,588 | 9/1973 | Anderson.......................... | 308/35 |

FOREIGN PATENTS OR APPLICATIONS

| | | | |
|---|---|---|---|
| 1,098,999 | 1/1968 | Great Britain...................... | 308/35 |
| 464,649 | 8/1928 | Germany........................... | 308/35 |

*Primary Examiner*—Charles J. Myhre
*Assistant Examiner*—R. H. Lazarus
*Attorney, Agent, or Firm*—Howson and Howson

[57] ABSTRACT

A bearing for supporting at least first and second members for movement relative to one another comprising a rolling bearing assembly including at least a pair of spaced apart rings having confronting raceways and a plurality of rolling elements in the annular space between said rings, one of said rings being mounted on one of said members, and a hydrostatic bearing assembly cooperatively associated with said rolling bearing assembly and including an element mounted on said other member having a surface confronting said other ring, means defining at least one chamber for a fluid medium under pressure formed by at least one pocket in said surface of said hydrostatic bearing element and the outer surface of said other ring whereby in operation of the bearing under applied load, when said chamber is pressurized, pressurization of said chamber operates to produce a force acting in a line containing the rings and rolling elements and in a direction to counterbalance the applied load and the rings rotate at substantially the same angular rate due to the fact that the friction in the rolling bearing is higher than in said hydrostatic bearing and said other ring engages the surface of said hydrostatic bearing when said chamber is not pressurized whereby said rings rotate relative to one another.

2 Claims, 3 Drawing Figures

COMBINED HYDROSTATIC BEARING AND ROLLING BEARING

The invention relates to a hydrostatic bearing and rolling bearing. Hydrostatic bearings are working by pressing a lubricant with a high pressure into a number of pockets in one of two interacting sliding surfaces, whereby the surfaces are separated and the bearing surfaces may move in relation to each other with extremely low friction. The bearing friction is low from the start, contrary to what is the case in hydrodynamic bearings, since the bearing surfaces are separated before relative movements occur. However, the lubricant has to be supplied under pressure if the bearing is to work properly, which implies that if for some reason the pressure in the lubricant were to cease when the bearing was loaded and running, the bearing surfaces would come into direct contact with each other, which in most cases would lead to a bearing breakdown. In order to prevent such a breakdown the bearing has to be supplied either with means which secure a maintained pressure of the lubricant when the bearing is running, or with means which prevent the bearing surfaces from moving in relation to each other if the lubricant pressure should cease and the bearing surfaces be brought into mutual contact.

With the present invention the above-mentioned problem is solved by the last mentioned principle, whereby the movements in the bearing in case of ceasing pressure are taken up by a rolling bearing. Compared to a hydrostatic bearing, a rolling bearing has higher frictional losses in operation, but it is independent of supply of lubricant under pressure. The present invention thus consists of a combined hydrostatic bearing and a rolling bearing, and the characterizing features of the invention will appear in the accompanying claims.

Figure 2:
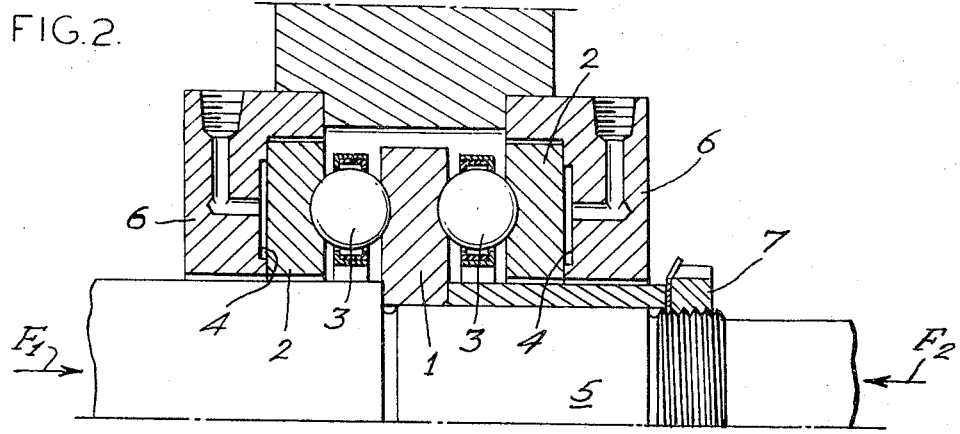
Figure 3:
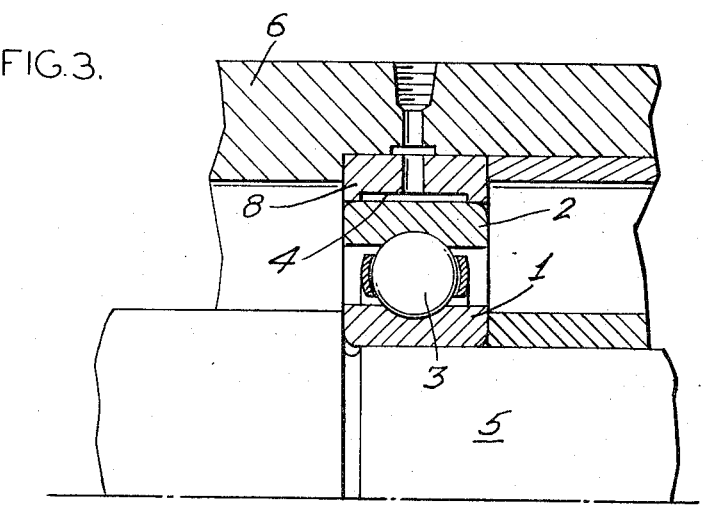

The invention will be described in detail with reference to the enclosed drawing, in which FIGS. 1 – 3 show three different embodiments of the invention, FIG. 1 showing a singleacting thrust bearing, FIG. 2 showing a double-acting thrust bearing and FIG. 2 showing a radial bearing.

In FIG. 1 a single-acting thrust bearing is shown, in which the direction of the load is indicated with the arrow F. The bearing comprises in principle a rolling bearing portion with a race ring 1 which is secured to the shaft 5, a number of rolling bodies 3 and one side of the bearing ring 2. The rings 1 and 2 are provided with raceways for the rolling bodies 3 in the surfaces which face each other. Further, the bearing comprises a hydrostatic bearing portion, consisting of partly the other side of the ring 2 and partly a bearing surface co-operating with the ring 2, which surface is situated on a fixed part 6 which takes up the axial load. In this case the fixed bearing surface is provided with a number of pockets 4, which through channels are provided with a lubricant which is supplied under pressure, whereby the ring 2 and the bearing surface in the fixed part 6 are separated. Upon rotation of the shaft 5 the rings 1 and 2 will rotate at the same speed, due to the fact that the friction in the rolling bearing portion is normally higher than in the hydrostatic bearing portion. The rotational speed in the bearing is equal to the rotational speed of the shaft. The rolling bodies 3 are then only subjected to a static thrust load, and any wear in the rolling bearing portion will normally not occur. If, however, the pressure in the bearing pockets 4 for some reason were to cease the ring 2 would sink down to the bearing surface of the part 6, whereby such a high friction would occur here that the ring 2 would cease to rotate, whereby instead a relative rotation would take place between the rings 1 and 2 when the rolling bearing portion 1, 2 and 3 started running.

In FIG. 2 a corresponding design is shown in a thrust bearing, which can be loaded in both directions with the forces $F_1$ and $F_2$ respectively. The ring 1 is secured to the shaft 5, which similarly to the embodiment of FIG. 1, is provided with a shoulder against which the ring 1 abuts and is secured against axial sliding by for example a nut 7 which is threaded to a threaded portion of the shaft 5 and set against the ring 1. Contrary to what is shown in FIG. 1, the ring is provided with raceways for rolling bodies 3 on both sides, where-by a combined bearing of the kind described in connection to FIG. 1 is provided at each side of the ring 1. When the thrust force is directed to the right, $F_1$, the bearing elements to the right of the ring 1 are loaded, and when the force is directed to the left, $F_2$, the bearing elements to the left of the ring 1 are loaded.

FIG. 3 shows a radial bearing according to the invention. In analogy to the above mentioned embodiments, the bearing comprises a ring 2, a ring 1 fixed to the shaft 5 and a number of rolling bodies arranged between these rings. The outside of the ring 2 constitutes a sliding bearing surface, which co-operates with a number of bearing blocks 8 situated around the ring 2, one of which blocks being shown in the figure. These blocks are provided with pockets 4 on their surfaces facing the ring 2, to which pockets a lubricant is supplied under pressure. Instead of a number of bearing blocks it is possible to use a ring which surrounds the ring 2 and is provided with a number of pockets. Similarly to what is described above, the ring 2 will be given the same rotational speed as the shaft 5 in normal operation, whereas if the pressure should cease in the pockets 4, the ring stops, whereby the shaft rotation is taken up in the rolling bearing portion 1, 2 and 3.

The invention is not limited to the above mentioned embodiments. For instance in the embodiment according to FIG. 2, the bearing portion to the left of the ring 1 may consist of only one hydrostatic part, whereby the left part of ring 1 is plane and co-operates directly with the bearing surface of the part 6. Such an embodiment may be sufficient if the load directed to the left, $F_2$, is relatively small and only occurs occasionally, whereby the risk of bearing breakdown in the left hand hydrostatic bearing is small even in case of pressure failure in the lubricant.

It is also possible to combine e.g., tapered or spherical hydrostatic bearings with corresponding rolling bearings, whereby bearings with ability to take up both thrust and radial loads can be achieved. Also angular contact ball bearings are usable in this case.

I claim:

1. A thrust bearing for supporting at least first and second members for movement relative to one another comprising a rolling bearing assembly including at least a pair of spaced apart rings having confronting raceways and a plurality of rolling elements in the annular space between said rings, one of said rings being mounted on one of said members, and a hydrostatic bearing assembly cooperatively associated with said rolling bearing assembly and including an element mounted on said other member having a surface confronting said other ring, means defining at least one chamber for a fluid medium under pressure formed by at least one pocket in said surface of said hydrostatic bearing element and the outer surface of said other ring whereby in operation of the bearing under applied thrust load, when said chamber is pressurized, pressurization of said chamber operates to produce a force acting in a line containing the rings and rolling elements and in a direction to counterbalance the applied thrust load and the rings rotate at substantially the same angular rate due to the fact that the friction in the rolling bearing is higher than in said hydrostatic bearing and said other ring engages the surface of said hydrostatic bearing when said chamber is not pressurized whereby said rings rotate relative to one another.

2. A bearing according to claim 1 wherein said rolling bearing comprises inner and outer rings provided with a raceway for the rolling elements on their confronting faces and another ring disposed between said inner and outer rings having raceways on opposite annular faces thereof and wherein rolling elements are provided between said inner ring and said other ring and between said outer ring and said other ring, and wherein said hydrostatic bearing includes an annular element confronting each of said inner and outer rings at the annular face thereof opposite the raceway face.

* * * * *